United States Patent
Tanabe (10) Patent No.: US 9,890,902 B2
(45) Date of Patent: Feb. 13, 2018

(54) HIGH-PRESSURE GAS TANK AND LINER WITH MOUTHPIECE

(71) Applicant: TOYOTA JIDOSHA KABUSHIKI KAISHA, Toyota-shi, Aichi-ken (JP)

(72) Inventor: Akira Tanabe, Okazaki (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 14/694,081

(22) Filed: Apr. 23, 2015

(65) Prior Publication Data

US 2015/0338022 A1    Nov. 26, 2015

(30) Foreign Application Priority Data

May 20, 2014    (JP) .................. 2014-103883

(51) Int. Cl.
*F17C 1/00* (2006.01)
*F17C 1/06* (2006.01)
(Continued)

(52) U.S. Cl.
CPC .............. *F17C 1/06* (2013.01); *F16J 12/00* (2013.01); *F17C 1/00* (2013.01); *F17C 13/002* (2013.01); *B29L 2031/7156* (2013.01); *F17C 2201/0109* (2013.01); *F17C 2201/056* (2013.01); *F17C 2201/058* (2013.01); *F17C 2203/011* (2013.01); *F17C 2203/0604* (2013.01);
(Continued)

(58) Field of Classification Search
CPC ..... F16J 12/00; F17C 1/00; F17C 1/06; F17C 13/002; F17C 2201/0109; F17C 2201/056; F17C 2201/058; F17C 2203/0604; F17C 2203/0619; F17C 2203/0663; F17C 2205/0305; F17C 2260/01; F17C 2260/017; F17C 2203/01105; F17C 2260/011; B29L 2031/7156; B29C 70/16
USPC .............. 220/23.9, 589, 590, 592, 601
See application file for complete search history.

(56) References Cited

U.S. PATENT DOCUMENTS 5,287,988 A * 2/1994 Murray .................. F16J 12/00
                                                                    220/589
6,227,402 B1 * 5/2001 Shimojima ............. F17C 1/16
                                                                    220/589

FOREIGN PATENT DOCUMENTS

| JP | 2010-96228 | 4/2010 |
|----|------------|--------|
| JP | 2012-82873 | 4/2012 |
| JP | 2012-180892 | 9/2012 |

* cited by examiner

*Primary Examiner* — Fenn C Mathew
*Assistant Examiner* — Elizabeth Volz
(74) *Attorney, Agent, or Firm* — Finnegan, Henderson, Farabow, Garrett & Dunner, LLP (57) ABSTRACT

A high-pressure gas tank includes a seal member that covers an opening recess from a surface of a liner on an outer side of an inner circumferential wall of a mouthpiece placing portion to a surface of a mouthpiece flange on a center side of a flange outer peripheral edge. The flange outer peripheral edge and the inner circumferential wall of the mouthpiece placing portion satisfy Dt>(Sm/Xgs)·100. Dt denotes a width of an opening of the opening recess and is defined as a distance between a flange outer peripheral edge-side end and an inner circumferential wall-side end of an opening of the opening recess. Sm denotes a maximum tolerance of a relative positional misalignment between the inner circumferential wall of the mouthpiece placing portion and an outer circumferential end of the flange outer peripheral edge. Xgs [%] denotes a breaking elongation of the seal member.

4 Claims, 6 Drawing Sheets

(51) Int. Cl.
  *F17C 13/00* (2006.01)
  *F16J 12/00* (2006.01)
  *B29L 31/00* (2006.01)
(52) U.S. Cl.
  CPC ................. *F17C 2203/0619* (2013.01); *F17C 2203/0663* (2013.01); *F17C 2205/0305* (2013.01); *F17C 2260/01* (2013.01); *F17C 2260/011* (2013.01); *F17C 2260/017* (2013.01)

Fig.1A

Fig.1B
A-A CROSS SECTION

Fig.1C
ENLARGED CROSS SECTIONAL
VIEW OF AREA B

Fig.3

ENLARGED CROSS SECTIONAL VIEW OF AREA B

Fig.4A $$Dt > \frac{Sm}{Xgs} \cdot 100$$

Xgs: BREAKING ELONGATION [%]

⇓

$$Xgs > Xgm\left(=\frac{Sm}{Dt} \cdot 100\right)$$

⇓

SUPPRESS BREAK

Fig.4B

Sm: AMOUNT OF DISPLACEMENT

Xgm: ELONGATION PERCENTAGE $\left(=\frac{Sm}{Dt} \cdot 100\right)$

Fig.5A $$Dtr < \frac{Sm}{Xgs} \cdot 100$$

Xgs : BREAKING ELONGATION [%]

⇩

$$Xgs < Xgmr \left(= \frac{Sm}{Dtr} \cdot 100 \right)$$

⇩

BREAK

Fig.5B

Sm : AMOUNT OF DISPLACEMENT
Xgmr : ELONGATION PERCENTAGE $\left(= \dfrac{Sm}{Dtr} \cdot 100 \right)$

Fig.6A $$Dt > \frac{Sm}{Xgs} \cdot 100$$

Xgs: BREAKING ELONGATION [%]
Sm: AMOUNT OF DISPLACEMENT

Fig.6B $$Dt > \frac{Sm}{Xgs} \cdot 100$$

Xgs: BREAKING ELONGATION [%]
Sm: AMOUNT OF DISPLACEMENT

HIGH-PRESSURE GAS TANK AND LINER WITH MOUTHPIECE

CROSS-REFERENCE TO RELATED APPLICATIONS

The present application claims the priority based on Japanese Patent Application No. 2014-103883 filed on May 20, 2014, the disclosure of which is hereby incorporated by reference in its entirety.

BACKGROUND OF THE INVENTION

Field of the Invention

The present invention relates to a high-pressure gas tank and a liner with mouthpiece.

Description of Related Art

A high-pressure gas tank is formed by coating a liner as a core material with a carbon fiber-reinforced plastic or a glass fiber-reinforced plastic (hereinafter collectively referred to as fiber-reinforced resin layer). A mouthpiece is mounted to an end of the liner for gas supply in the tank or gas refill into the tank. The liner is generally formed as a resin hollow container having gas barrier property in terms of weight reduction, and the mouthpiece is a metal molded product. The fiber-reinforced resin layer is formed by a filament winding method (hereinafter referred to as "FW method") that includes winding fiber bundles impregnated with a thermosetting resin such as an epoxy resin to cover the surface of the liner equipped with the mouthpiece, and then heating and curing the thermosetting resin.

JP 2012-82873A teaches to apply a film from the surface of the periphery of the mouthpiece down to the surface of the periphery of the liner, in order to suppress the thermosetting resin, which has flowability prior to curing, from entering between the mouthpiece and the liner, thereby ensuring the gas sealing property between the mouthpiece and the liner during the curing process of the thermosetting resin.

SUMMARY

In the process of winding the fiber bundles impregnated with the thermosetting resin on the liner, for example, a load applied from the fiber bundles to the liner may cause a relative positional misalignment between the mouthpiece and the liner. The relative positional misalignment between the mouthpiece and the liner may cause the film applied and fixed to the surface to have elongation by an amount of displacement corresponding to the positional misalignment. When the elongation of the film becomes equal to or higher than a breaking elongation, or a critical elongation that causes a break, the film is likely to break. The break of the film may cause the thermosetting resin to enter between the mouthpiece and the liner, and may have difficulty in ensuring the gas sealing property between the mouthpiece and the liner. Other needs include a simple configuration to ensure the gas sealing property between the liner and the mouthpiece and cost reduction.

In an embodiment, there is provided a high-pressure gas tank. The high-pressure gas tank comprises: a liner provided as a cylindrical hollow container; a mouthpiece mounted to the liner; and a fiber-reinforced resin layer formed by winding a fiber bundle impregnated with a thermosetting resin on a surface of the liner. The liner has a mouthpiece placing portion for mounting the mouthpiece at an end in an axial direction. The mouthpiece includes a mouthpiece flange arranged to be placed in the mouthpiece placing portion, and a mouthpiece body protruded from the mouthpiece flange, the mouthpiece having an opening recess formed between a flange outer peripheral edge of the mouthpiece flange and an inner circumferential wall of the mouthpiece placing portion. The high-pressure gas tank further comprises a seal member extended in a layer like form to cover the opening recess from a surface of the liner on an outer side of the inner circumferential wall of the mouthpiece placing portion to a surface of the mouthpiece flange on a center side of the flange outer peripheral edge. In a vertical section of the high-pressure gas tank, the flange outer peripheral edge and the inner circumferential wall of the mouthpiece placing portion are formed to satisfy Expression (1):

$$Dt > (Sm/Xgs) \cdot 100 \tag{1}$$

where Dt denotes a width of an opening or inlet of the opening recess, said Dt being defined to be a distance between a flange outer peripheral edge-side end and an inner circumferential wall-side end of an opening of the opening recess, Sm denotes a maximum tolerance of a relative positional misalignment between the inner circumferential wall of the mouthpiece placing portion and an outer circumferential end of the flange outer peripheral edge, and Xgs [%] denotes a breaking elongation of the seal member.

The invention may be implemented by any of various aspects, for example, a high-pressure gas tank and a mouthpiece-mounted liner used for high-pressure gas tank.

DESCRIPTION OF EMBODIMENTS

Figure 1A:
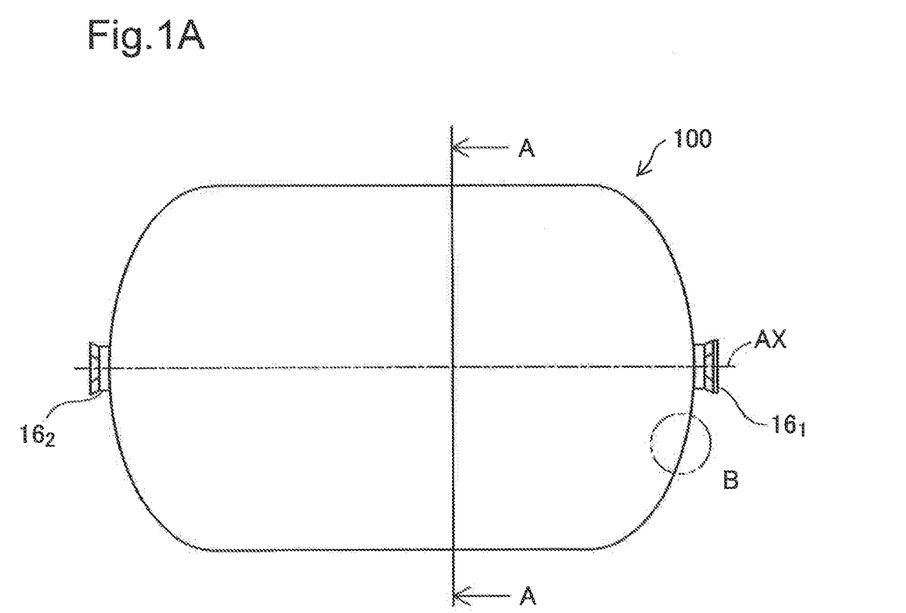
FIGS. 1A-1C illustrate the configuration of a high-pressure gas tank according to one embodiment of the invention by its appearance view, sectional view and enlarged main part sectional view.
Figure 1B:
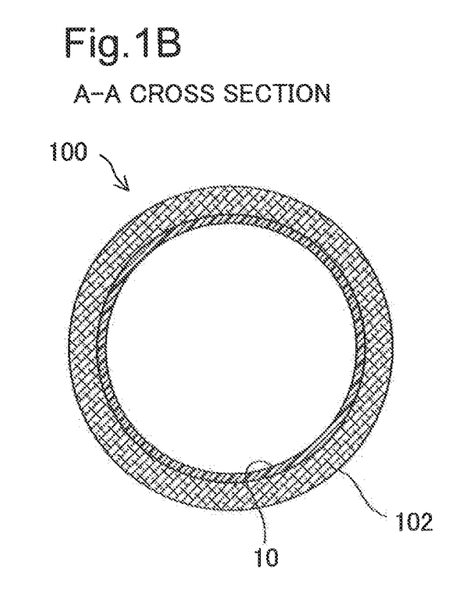
Figure 1C:
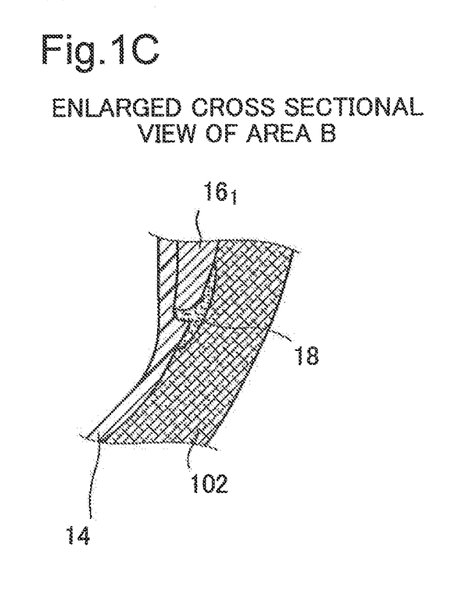
Figure 2A:
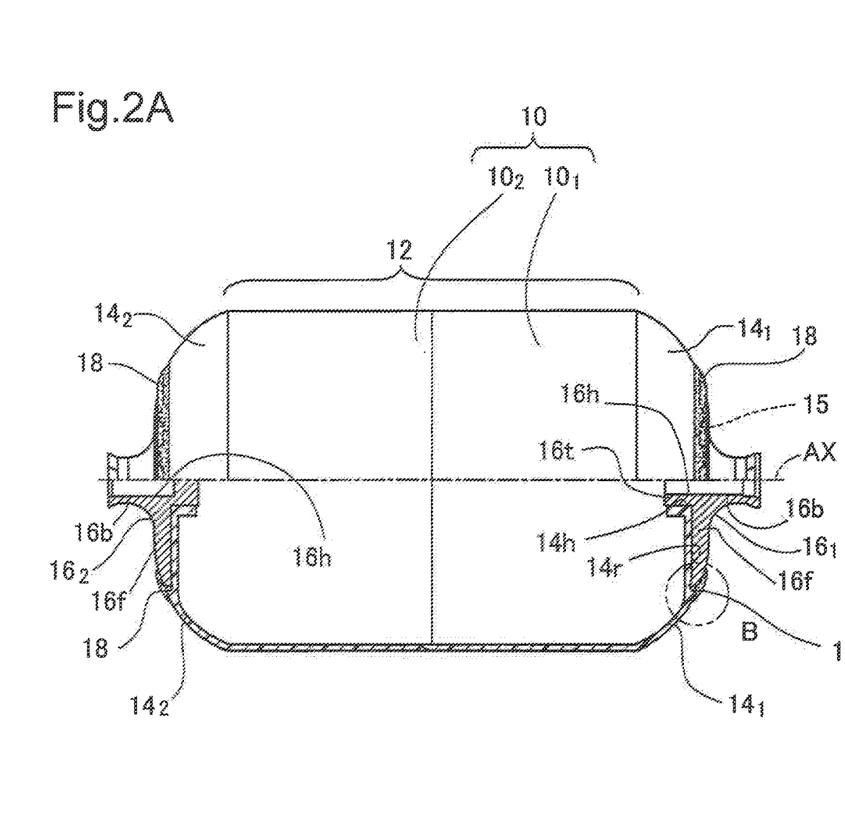
FIGS. 2A-2B illustrate the configuration of a liner as the core of the high-pressure gas tank by its half sectional view and front view.
Figure 2B:
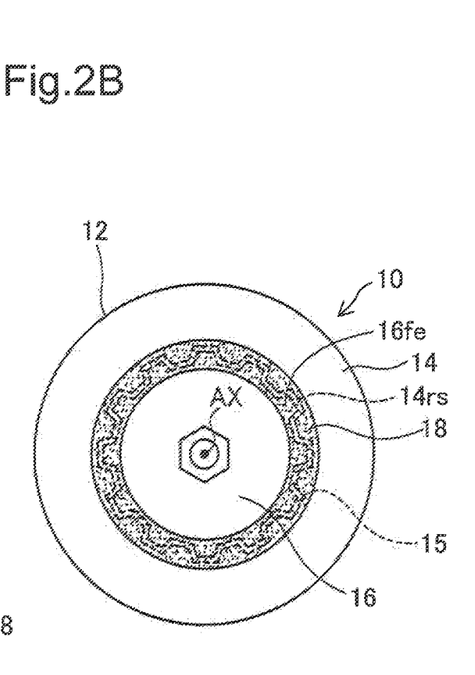
Figure 3:
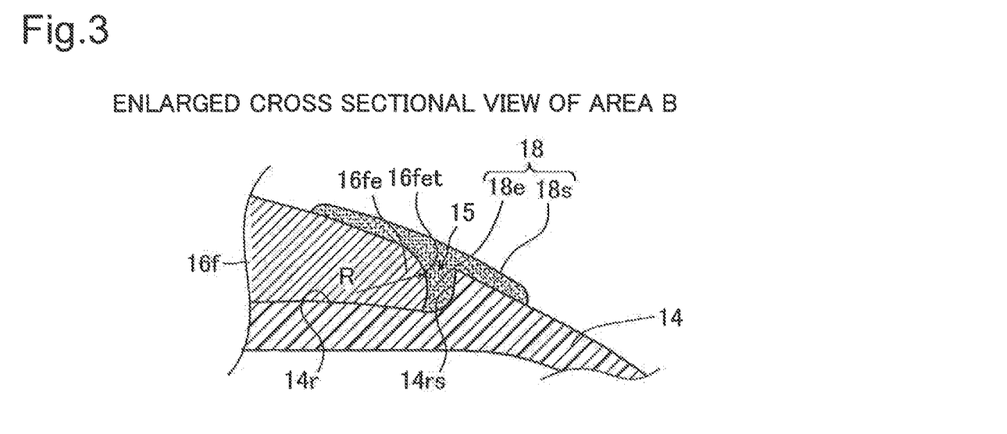
FIG. 3 is an enlarged sectional view illustrating an area B in FIG. 2.

FIGS. 1A-1C illustrate the configuration of a high-pressure gas tank 100 according to one embodiment of the invention by its appearance view, sectional view and enlarged main part sectional view. FIGS. 2A-2B illustrate the configuration of a liner 10 as the core of the high-pressure gas tank 100 by its half sectional view and front view. FIG. 3 is an enlarged sectional view illustrating an area B in FIG. 2A. The half sectional view of FIG. 2A and the enlarged sectional view of FIG. 3 illustrate the longitudinal section of a mouthpiece-mounted liner or more specifically the liner 10 as the core of the high-pressure gas tank 100 with mouthpieces 16, taken along a liner axis AX.

As shown in FIG. 1A, the high-pressure gas tank 100 is configured to have a liner 10 covered with a fiber-reinforced resin layer 102, and two mouthpieces $16_1$, $16_2$ protruded from both ends thereof. The fiber-reinforced resin layer 102 is formed by winding fiber bundles impregnated with a thermosetting resin on the outer periphery of the liner 10 by the FW method. Formation of the fiber-reinforced resin layer 102 generally uses an epoxy resin as the thermosetting resin, but may use another thermosetting resin such as a polyester resin or a polyamide resin. The reinforcing fiber, or sliver fiber, to be wound on the surface of the liner by the FW method may be, for example, glass fiber, carbon fiber or aramid fiber. The fiber-reinforced resin layer 102 may be formed as multi resin layers of different fibers by successively winding a plurality of different types of fibers (for example, glass fiber and carbon fiber) on the outer periphery of the liner 10 by the FW method.

As shown in FIG. 2A, the liner 10 is a hollow tank container and is provided as a joint assembly of a pair of liner parts $10_1$, $10_2$ halved along the center in the longitudinal direction of the tank. The two-divisional liner parts $10_1$, $10_2$ are respectively formed by molding of a resin such as a nylon-based resin. The molded liner parts $10_1$, $10_2$ are joined with each other by laser fusing, so as to form the liner 10. The liner 10 thus joined has two spherical dome portions $14_1$, $14_2$ provided on the respective ends of a cylindrical cylinder portion 12. This liner 10 has recessed mount parts 14r for mounting the mouthpieces $16_1$, $16_2$ on the tops of the respective dome portions $14_1$, $14_2$, i.e., on the respective ends in the longitudinal direction along an axial line (hereinafter also called "liner axis") AX of the liner 10, and through holes 14h formed at the respective centers of the recessed mount parts 14r. The through holes 14h are formed to be aligned on the liner axis AX and serve as positioning holes for the mouthpieces $16_1$, $16_2$.

Each mouthpiece 16 is made of a metal and includes a mouthpiece flange 16f arranged to be placed in the recessed mount portion 14r, a mouthpiece body 16b protruded from the mouthpiece flange 16f toward the top of the dome portion 14, a convex 16t protruded from the mouthpiece flange 16f toward the center of the liner 10 and a valve connection hole 16h. The convex 16t is fit in the through hole 14h of the dome portion 14 and serves, in cooperation with the through hole 14h, to position the mouthpiece 16 relative to the liner 10. The valve connection hole 16h is formed to pass through the center of one mouthpiece $16_1$ and has a high-pressure sealing-type tapered threaded portion provided on its opening side for connection of piping. In the other mouthpiece $16_2$, the connection hole 16h is formed as a bottomed hole closed at the inside of the tank 100. Both the mouthpieces $16_1$, $16_2$ of the tank 100 are also used to mount a rotating shaft for winding the fibers for the purpose of formation of, for example, the fiber-reinforced resin layer 102.

As shown in FIG. 3, the mouthpiece flange 16f includes an outer peripheral edge portion 16fe (hereinafter also called "flange outer peripheral edge portion 16fe") having an outer surface 16fet in a curved surface shape by arc-like inclination, for example, a curved surface shape by round chamfering in a radius R, such that the thickness of the flange outer peripheral edge portion 16fe decreases from the mouthpiece body 16b-side (hereinafter also called "center side") toward the outer peripheral edge of the flange 16f. An opening recess 15 is formed between the outer surface 16fet of the flange outer peripheral edge portion 16fe and a recess inner circumferential wall 14rs of the recessed mount portion 14r.

The recessed mount portion 14r may be also referred to as a "mouthpiece placing portion", and the recess inner circumferential wall 14rs may be also referred to as an "inner circumferential wall" of the mouthpiece placing portion.

A gasket member 18 formed by applying and curing an FIPG (Formed In Place Gasket) as a liquid gasket is provided to cover the opening recess 15 in a boundary area between the flange outer peripheral edge portion 16fe of each mouthpiece 16 and the recessed mount portion 14r of the liner 10, as shown in FIGS. 2A and 3. The gasket member 18 includes a layer-like portion 18s and an embedded portion 18e. The layer-like portion 18s extends in a layer-like form across the recessed mount part (mouthpiece placing portion) 14r, that is, from an surface (or a liner outer surface) of the dome portion 14 of the liner 10 on the outer side of the recess inner circumferential wall 14rs of the recessed mount part (mouthpiece placing portion) 14r to an surface of the mouthpiece flange 16f on the center side of the flange outer peripheral edge portion 16fe. The embedded portion 18e enters the inside of the opening recess 15. The embedded portion 18e may have various forms according to the state of application and curing of the FIPG; the embedded portion 18e may not exist at all, or the embedded portion 18e may partly or fully fill the opening recess 15.

As shown in FIG. 2B, the recess inner circumferential wall 14rs of the recessed mount portion 14r of the dome portion 14 is arranged to serpentine about the liner axis AX in a rectangular waveform, and surround the liner axis AX. An outer circumferential end of the flange outer peripheral edge portion 16fe of the mouthpiece flange 16f is also arranged to serpentine corresponding to the serpentine configuration of the recess inner circumferential wall 14rs. The opening recess 15 is accordingly arranged to surround the liner axis AX along this serpentine trajectory, and the part of the gasket member 18 placed in the opening recess 15 is also arranged to surround the liner axis along the serpentine trajectory. The layer-like portion 18s of the gasket member 18 (FIG. 3) are arranged to extend across the opening recess 15 of the serpentine trajectory to surround the liner axis AX in a circular-belt-like or ring-like shape.

Figure 4A:
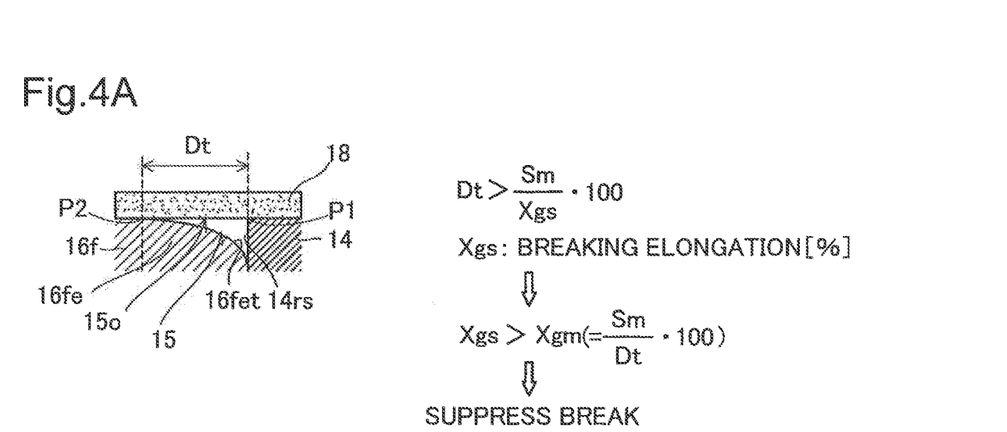
FIGS. 4A-4B schematically illustrate the cross section of an opening recess covered by a gasket member.
Figure 4B:
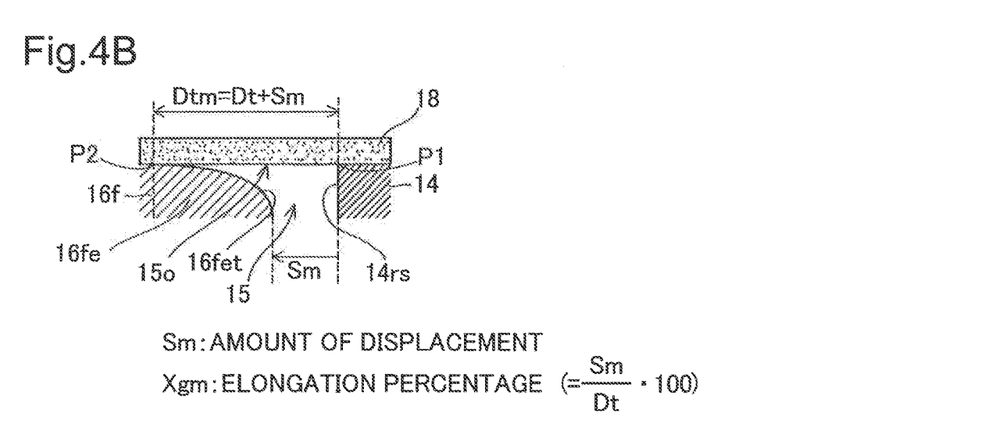

FIGS. 4A-4B schematically illustrate the cross section of the opening recess 15 covered by the gasket member 18. Like the cross section of FIG. 3, the cross sections of FIGS. 4A-4B are vertical sections of the mouthpiece-mounted liner 10 or more specifically the liner 10 as the core of the high-pressure gas tank 100 with the mouthpieces 16, taken along the linear axis AX. The gasket member 18, arranged to cover the opening recess 15, typically has the embedded portion 18e entering the inside of the opening recess 15 in the course of applying the FIPG. The FIPG may, however, not uniformly enter the inside of the entire opening recess 15, and the FIPG may form only the layer-like portion 18s without entering the inside of the opening recess 15. The following description is on the assumption that the applied FIPG does not enter the inside of the opening recess 15 but the resulting gasket member 18 is formed as a thin layer (thin film), or more specifically consists of only the layer-like portion 18s.

As shown in FIG. 4A, the gasket member 18 is arranged to cover the opening recess 15 from the surface of the dome portion 14 on the outer side (right side in the illustration) of the recess inner circumferential wall 14rs of the recessed mount part (mouthpiece placing portion) 14r to the surface of the mouthpiece flange 16f on the center side (left side in the illustration) of the flange outer peripheral edge 16fe. An area between two contact points P1 and P2 forms an opening or inlet 15o of the opening recess 15. The first contact point is a point at which the gasket member 18 is in contact with the surface of the dome portion 14 of the liner 10 on an upper edge of the recess inner circumferential wall 14rs. The second contact point P2 is a point at which the gasket member 18 is in contact with the surface 16fet of the flange outer peripheral edge portion 16fe of the mouthpiece flange 16f.

A distance between the two contact points P1 and P2 is defined to be a width Dt of the opening 15o. The first contact point P1 corresponds to the inner circumferential wall-side end of the opening 15o of the opening recess 15, and the second contact point P2 corresponds to the flange outer peripheral edge-side end of the opening 15o of the opening recess 15.

The arc shape or curved surface shape of the surface 16fet of the flange outer peripheral edge portion 16fe is formed such that the width Dt of the opening 15o satisfies the following Expression (2):

$$Dt > (Sm/Xgs) \cdot 100 \qquad (2)$$

where Xgs denotes a braking elongation [%] of the gasket member 18, and Sm denotes a maximum tolerance of a relative positional misalignment between the recess inner circumferential wall 14rs and the outer circumferential end of the flange outer peripheral edge portion 16fe as shown in FIG. 4B when the mouthpiece 16 is mounted to the liner 10 such that the mouthpiece flange 16f is placed in the recessed mount part (mouthpiece placing portion) 14r. Such a misalignment may be attributed to a load applied from the fiber bundles to the liner 10 in the process of winding the fiber bundles impregnated with the thermosetting resin on the liner 10 by the FW method.

The maximum tolerance Sm elongates the gasket member 18 to increase the width of the opening 15o to be Dtm(=Dt+Sm) as shown in FIG. 4B. An elongation percentage Xgm is expressed by the following Equation (3):

$$Xgm = ((Dtm \cdot Dt)/Dt) \cdot 100 = (Sm/Dt) \cdot 100 \qquad (3)$$

Substituting this Equation (3) into the above Expression (2) gives the following relationship of Expression (4) between the elongation percentage Xgm and the breaking elongation Xgs, which shows that the elongation percentage Xgm is lower than the breaking elongation Xgs:

$$Xgs > Xgm = (Sm/Dt) \cdot 100 \qquad (4)$$

Accordingly, upon satisfaction of the above Expression (2), this suppresses break of the gasket member 18 even when the gasket member 18 has elongation corresponding to the maximum tolerance Sm due to the relative positional misalignment between the recess inner circumferential wall 14rs and the outer circumferential end of the flange outer peripheral edge portion 16fe of the mouthpiece flange 16f.

When the FIPG enters the inside of the opening recess 15 to form the embedded portion 18e a similar break is likely to occur at the boundary between the embedded portion 18e and the layer-like portion 18s (shown in FIG. 3). Accordingly, the above discussion on the assumption that the gasket member 18 consists of only the layer-like portion 18s without the embedded portion 18e is also applicable to the case that the embedded portion 18e is formed.

Figure 5A:
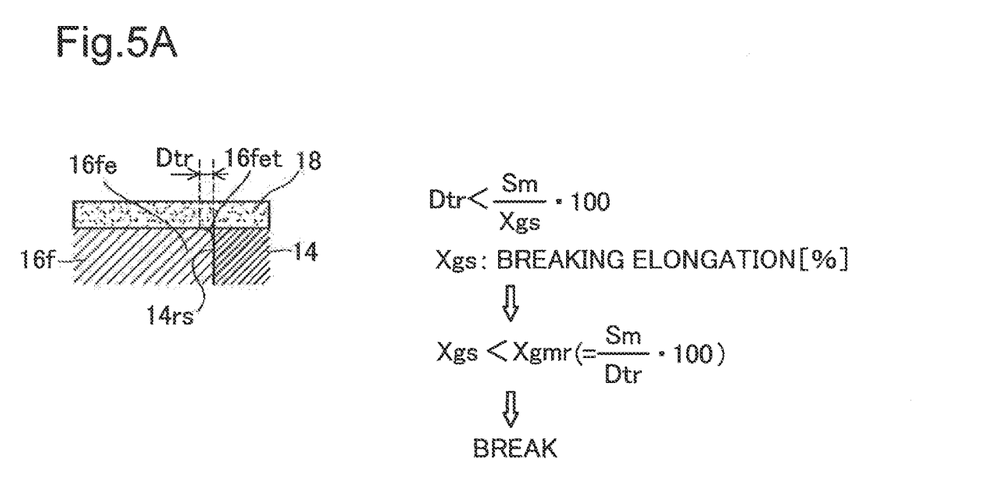
FIGS. 5A-5B schematically illustrate the cross section of the opening recess covered by the gasket member as a comparative example.
Figure 5B:
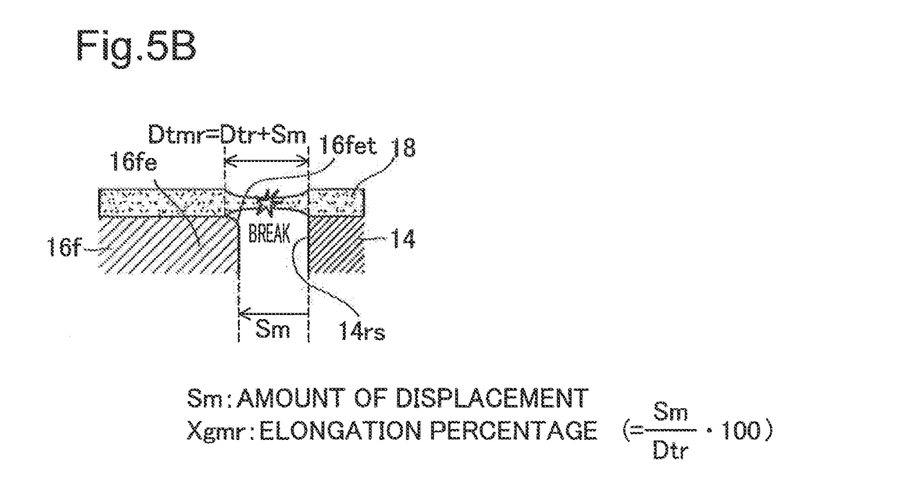

FIGS. 5A-5B schematically illustrate the cross section of the opening recess 15 covered by the gasket member 18 as a comparative example. As shown in FIG. 5A, the surface 16fet of the outer peripheral edge portion 16fe of the mouthpiece flange 16f is assumed to have such a shape that the width Dtr of the opening does not satisfy the above Expression (2). In more concrete terms, the surface 16fet has a shape that satisfies the following Expression (5), that is, a slightly round shape chamfered by light chamfering or round chamfering in a radius R of several millimeters:

$$Dtr \leq (Sm/Xgs) \cdot 100 \qquad (5)$$

In this case, as shown in FIG. 5B, without consideration of brake, the maximum tolerance Sm elongates the gasket member 18 to increase the width of the opening to be Dtmr(=Dtr+Sm). An elongation percentage Xgmr is expressed by the following Equation (6):

$$Xgmr = ((Dtmr - Dtr)/Dtr) \cdot 100 = (Sm/Dtr) \cdot 100 \qquad (6)$$

Substituting this Equation (6) into above Expression (5) gives the following Expression (7) between the elongation percentage Xgmr and the breaking elongation Xgs, which shows that the elongation percentage Xgmr is not lower than the breaking elongation Xgs:

$$Xgs \leq Xgmr = (Sm/Dtr) \cdot 100 \qquad (7)$$

Accordingly, in the comparative example, the gasket member 18 is likely to be broken when the gasket member 18 has elongation with the maximum tolerance Sm due to the relative positional misalignment between the recess inner circumferential wall 14rs and the outer circumferential end of the flange outer peripheral edge portion 16fe of the mouthpiece flange 16f. The break occurring in the gasket member 18 deteriorates the sealing property of the opening recess 15 by the gasket member 18 and may cause the thermosetting resin to enter the inside of the opening recess 15 and further between the bottom face of the recessed mount portion 14r and the bottom face of the mouthpiece flange 16f in the course of formation of the fiber-reinforced resin layer.

In the embodiment, on the other hand, as described above, the surface 16fet of the outer peripheral edge portion 16fe of the mouthpiece flange 16f has the arc shape formed to have the width Dt satisfying the above Expression (2). This configuration suppresses a break of the gasket member 18, thereby maintaining the sealing property of the opening recess 15 by the gasket member 18 even when the gasket member 18 has elongation with the maximum tolerance Sm due to the relative positional misalignment between the recess inner circumferential wall 14rs and the outer circumferential end of the flange outer peripheral edge portion 16fe of the mouthpiece flange 16f. This configuration also suppresses the thermosetting resin from entering the inside of the opening recess 15 and further between the bottom face of the recessed mount portion 14r and the bottom face of the mouthpiece flange 16f in the course of formation of the fiber-reinforced resin layer. This ensures the gas sealing property between the mouthpieces 16 and the liner 10 by the gasket members 18. With respect to a sealing material of a certain maximum tolerance Sm used for sealing between the liner and the mouthpiece, adjusting the width Dt to satisfy the above Expression (2) between the width Dt and the breaking elongation Xgs may decrease the value of the breaking elongation Xgs required for the sealing material. This allows for cost reduction using an inexpensive sealing material. Further, since the gasket member 18 is formed by applying and curing the FIPG, this ensures the gas sealing property between the mouthpiece and the liner by the simple configuration. The upper limit of the width Dt is determined by taking into account the working tolerance of the mouthpiece, optimization of the mass and the weight and the safety ratio.

The gasket member 18 may be also referred to as a "seal member."

Figure 6A:
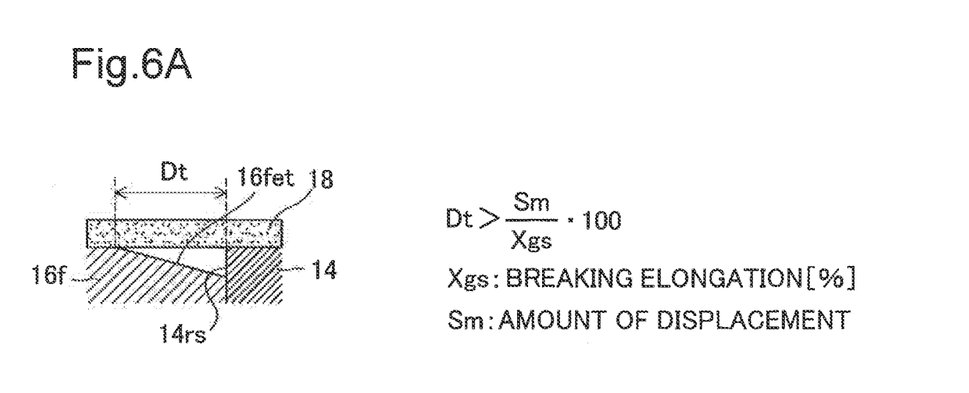
FIGS. 6A-6B schematically illustrate the cross section of the opening recess covered by the gasket member according to modifications.
Figure 6B:
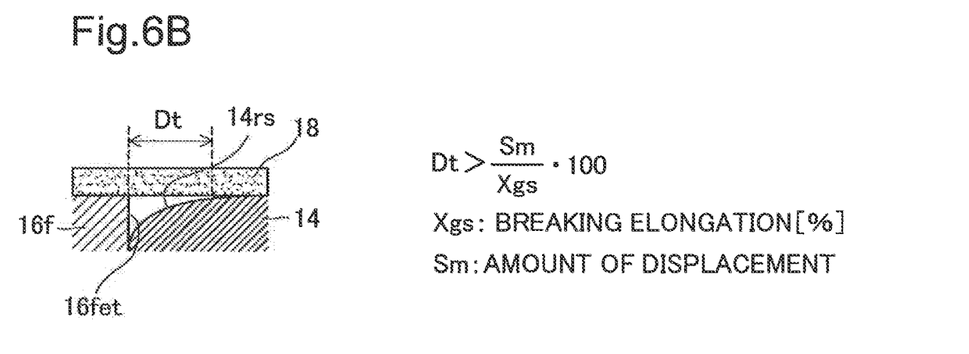

FIGS. 6A-6B schematically illustrate the cross section of the opening recess 15 covered by the gasket member 18 according to modified examples. In the above embodiment, as shown in FIGS. 3 and 4A-4B, the surface 16*fet* of the flange outer peripheral edge portion 16*fe* of the mouthpiece flange 16*f* is formed to have an arc shape or a curved surface shape. In a modification, as shown in FIG. 6A, the surface 16*fet* of the flange outer peripheral edge portion 16*fe* may be formed in a planar shape inclined so as to have the width Dt satisfying the above Expression (2). In another modification, as shown in FIG. 6B, the recess inner circumferential wall 14*rs* of the recessed mount portion 14*r* provided on the dome portion 14 of the liner 10 may be formed in an arc shape or a curved surface shape to have the width Dt satisfying the above Expression (2). In another modification, although not being specifically illustrated, the recess inner circumferential wall 14*rs* may be formed in an inclined planar shape like FIG. 6A. In yet another modification, both the surface 16*fet* of the flange outer peripheral edge portion 16*fe* and the recess inner circumferential wall 14*rs* may be formed in an arc shape (or a curved surface shape) or in an inclined planar shape. In general, an area between a contact point at which the gasket member 18 is in contact with the surface of the dome portion 14 of the liner 10 on the upper edge of the recess inner circumferential wall 14*rs* and a contact point at which the gasket member 18 is in contact with the surface (surface 16*fet* of the flange outer peripheral edge 16*fe*) of the mouthpiece flange 16*f* is defined to form an opening or inlet of the opening recess 15. The shape of the opening having the width Dt preferably satisfies the above Expression (2), where the width Dt of opening denotes the distance between the contact point (inner circumferential wall-side end of the mouthpiece placing portion) at which the gasket member 18 is in contact with the surface of the dome portion 14 of the liner 10 on the upper edge of the recess inner circumferential wall 14*rs* and the contact point (flange outer peripheral edge-side end) at which the gasket member 18 is in contact with the surface (surface 16*fet* of the flange outer peripheral edge 16*fe*) of the mouthpiece flange 16*f*.

Figure 7:
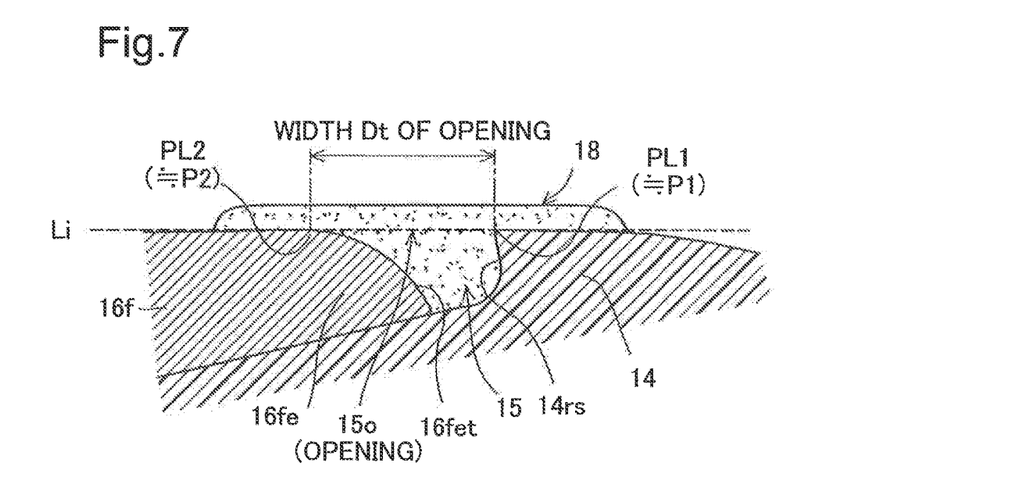
FIG. 7 illustrates an example of measuring a width of opening.

The width Dt of the opening of the opening recess 15 may be measured by a procedure described below. FIG. 7 is a diagram illustrating an example of measuring the width Dt of the opening. In the vertical section of the high-pressure gas tank 100, a straight line Li is assumed to be in contact with the surface of the liner 10 (dome portion 14) on the outer side of the upper edge of the recess inner circumferential wall 14*rs* of the recessed mount part (mouthpiece placing portion) 14*r* and also in contact with the surface of the mouthpiece flange 16*f*. The surface of the dome portion 14 and the surface of the mouthpiece flange 16*f* on the center side of the flange outer peripheral edge portion 16*fe* are generally arranged to form a smooth contour when taking no account of the opening recess 15. In many cases, the contour line at the opening of the opening recess 15 may thus be allowed to be approximated by a straight line. Accordingly, in general, a contact point PL2 at which the straight line Li is in contact with the surface (surface 16*fet* of the flange outer peripheral edge 16*fe*) of the mouthpiece flange 16*f* may be allowed to approximate the contact point P2 at which the gasket member 18 is in contact with the surface of the mouthpiece flange 16*f*. Another contact point PL1 at which the straight line Li is in contact with the liner 10 (dome portion 14) on the outer side of the recess inner circumferential wall 14*rs* (including the upper edge of the recess inner circumferential wall 14*rs*) may be allowed to approximate the contact point P1 at which the gasket member 18 is in contact with the surface of the liner 10 (dome portion 14). An area between these two contact points PL1 and PL2 may thus be regarded to define the opening 15*o*. In this case, the width Dt of the opening may be regarded as the distance between these two contact point PL2 and PL1.

Figure 8A:
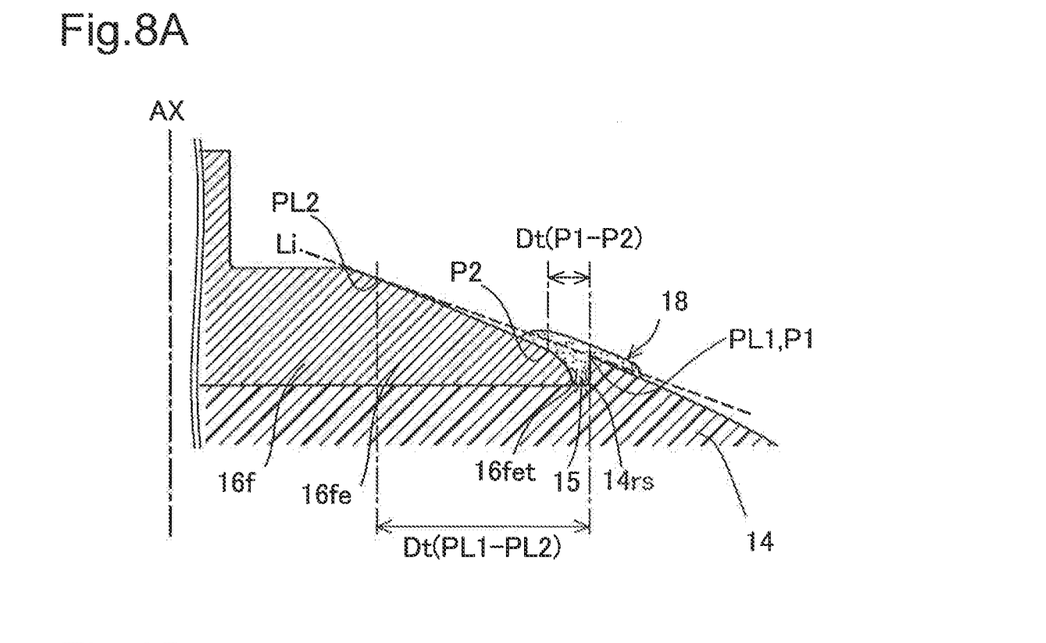
FIGS. 8A-8B illustrate another example of measuring a width of opening.
Figure 8B:
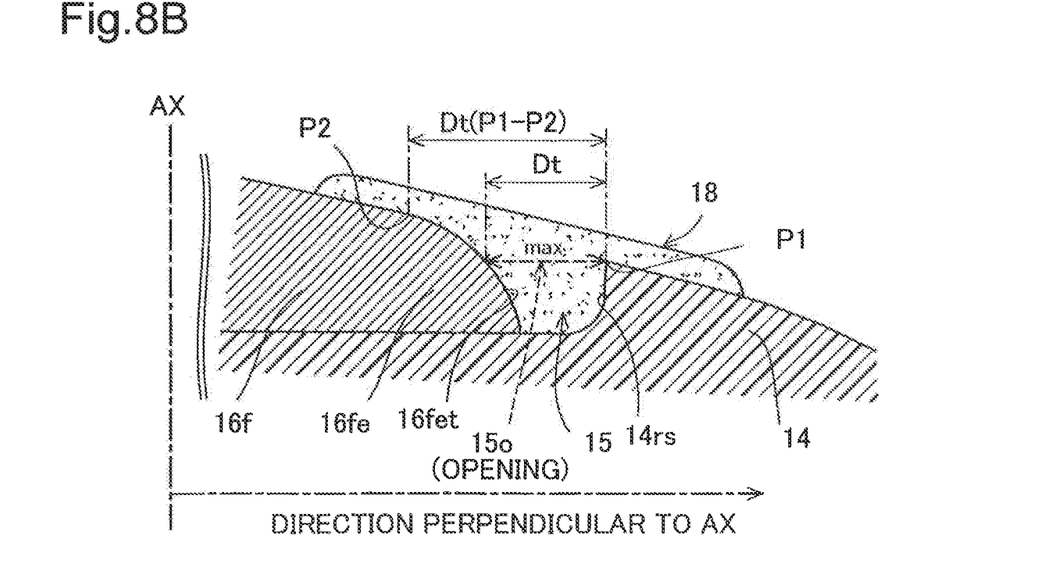

The width Dt of the opening of the opening recess 15 may be measured by another procedure described below. FIGS. 8A-8B illustrate another example of measuring the width Dt of the opening. As shown in FIG. 8A, according to the shape of the mouthpiece flange 16*f*, the position of the contact point PL2 at which the assumed straight line Li is in contact with the surface of the mouthpiece flange 16*f* may be outside of the area of the opening recess 15 covered by the gasket member 18. The same may apply to the contact point PL1 at which the assumed straight line Li is in contact with the surface of the liner 10 (dome portion 14), although not being specifically illustrated. In this case, a distance Dt(PL1–PL2) between the contact points PL1 and PL2 of the assumed straight line Li may become greater than a distance Dt(P1–P2) between contact points P1 and P2 (hereinafter also called "assumed contact points") that are assumed to be equivalent to the contact point P1 and the contact point P2 of the gasket member 18 shown in FIG. 4A. Even when this distance DT(PL1–PL2) satisfies the above Expression (2), the distance Dt(P1–P2) between the assumed contact points P1 and P2 of the gasket member 18 may not satisfy the above Expression (2), and may not have the advantageous effect of suppressing a break of the gasket member 18.

In the case of FIG. 8A, the width Dt of the opening 15*o* may be determined as shown in FIG. 8B. In the vertical section of the high-pressure gas tank 100, an area having a maximum distance in a direction perpendicular to the liner axis AX between the surface 16*fet* of the flange outer peripheral edge portion 16*fe* of the mouthpiece flange 16*f* and the recess inner circumferential wall 14*rs* may be regarded as the opening, and the maximum distance may be measured to be the width Dt of the opening. When the width Dt of the opening is measured in this manner, the distance Dt(P1–P2) between the assumed contact points P1 and P2 of the gasket member 18 is not smaller than the measured width Dt of the opening. Accordingly, when the measured width Dt of the opening satisfies the above Expression (2), the width Dt(P1–P2) between the assumed contact points P1 and P2 of the gasket member 18 is to satisfy the above Expression (2), thereby suppressing a break of the gasket member 18.

The flange outer peripheral edge 16*fe*-side end that defines the width Dt of the opening may be that portion of the curved surface 16*fet* of the flange outer peripheral edge 16*fe* which is closest to the mouthpiece body 16*b*. Alternatively, the flange outer peripheral edge 16*fe*-side end may be defined to be a boundary position where the curvature of the surface 16*fet* of the mouthpiece flange 16*f* is significantly changed, for example, a starting position on the mouthpiece body 16*e*-side of an arc shape (curved surface shape) or an inclined planar shape (for example, a cut) formed by, for example, chamfering for formation of the recess opening 15. The recess inner circumferential wall 14*rs*-side end defining the width Dt of the opening may be the upper edge of the recess inner circumferential wall 14*rs*. Alternatively, the recess inner circumferential wall 14*rs*-side end may be defined to be a boundary position where the curvature of the surface of the liner 10 (dome portion 14) on the outer side of the recess inner circumferential wall 14*rs* is significantly changed, for example, a starting position on the opposite side to (on the outer side of) the recess inner circumferential wall 14*rs* of an arc shape (curved surface shape) or an inclined planar shape (for example, a cut) formed by, for example, chamfering for formation of the recess opening 15.

In the above embodiment, the gasket member 18 is formed by applying the FIPG. The gasket member 18 serving as the seal member may be formed by applying a film made of any of various suitable resins such as polyamide, polypropylene polyethylene and polyester.

The invention is not limited to the embodiment and the modifications described above but may be implemented by a diversity of other configurations without departing from the scope of the invention. For example, the technical features of any of the above embodiment and its modifications corresponding to the technical features of each of the aspects described in Summary may be replaced or combined appropriately, in order to solve part or all of the problems described above or in order to achieve part or all of the advantageous effects described above. Any of the technical features may be omitted appropriately unless the technical feature is described as essential in the description hereof.

What is claimed is:

1. A high-pressure gas tank, comprising:
   a liner provided as a cylindrical hollow container;
   a mouthpiece mounted to the liner; and
   a fiber-reinforced resin layer formed by winding a fiber bundle impregnated with a thermosetting resin on an surface of the liner, wherein
   the liner has a recessed mouthpiece placing portion for mounting the mouthpiece at an end in an axial direction, the recessed mouthpiece placing portion including a mouthpiece contacting surface contacting the mouthpiece and a recess inner circumferential wall surrounding the mouthpiece, the recess inner circumferential wall rising from the mouthpiece contacting surface in an axis direction of the high pressure gas tank,
   the mouthpiece includes a mouthpiece flange arranged to be placed in the recessed mouthpiece placing portion, and a mouthpiece body protruded from the mouthpiece flange, the mouthpiece having an opening recess formed between a flange outer peripheral edge of the mouthpiece flange and the recess inner circumferential wall of the recessed mouthpiece placing portion,
   the high-pressure gas tank further comprising:
   a seal member extended in a layer-like form to cover the opening recess from a surface of the liner on an outer side of the recess inner circumferential wall of the recessed mouthpiece placing portion to a surface of the mouthpiece flange on a center side of the flange outer peripheral edge, wherein
   the seal member is not disposed between the mouthpiece contacting surface of the liner and the mouthpiece flange, and
   in a vertical section of the high-pressure gas tank, the flange outer peripheral edge and the recess inner circumferential wall of the recessed mouthpiece placing portion are formed to satisfy Expression (1):

$$Dt > (Sm/Xgs) \cdot 100 \tag{1}$$

where Dt denotes a width of an opening of the opening recess, said Dt being defined to be a distance between a flange outer peripheral edge-side end and a recess inner circumferential wall-side end of an opening of the opening recess, Sm denotes a maximum tolerance of a relative positional misalignment between the recess inner circumferential wall of the recessed mouthpiece placing portion and an outer circumferential end of the flange outer peripheral edge, and Xgs [%] denotes a breaking elongation of the seal member.

2. The high-pressure gas tank according to claim 1, wherein the seal member is formed by applying and curing a liquid gasket.

3. A mouthpiece-mounted liner formed from a cylindrical hollow container equipped with a mouthpiece, comprising:
   a recessed mouthpiece placing portion for mounting the mouthpiece at one end in an axial direction, the recessed mouthpiece placing portion including a mouthpiece contacting surface contacting the mouthpiece and a recess inner circumferential wall surrounding the mouthpiece, the recess inner circumferential wall rising from the mouthpiece contacting surface in an axis direction of the high-pressure gas tank, wherein
   the mouthpiece includes a mouthpiece flange arranged to be placed in the recessed mouthpiece placing portion, and a mouthpiece body protruded from the mouthpiece flange, the mouthpiece having an opening recess formed between a flange outer peripheral edge of the mouthpiece flange and the recess inner circumferential wall of the recessed mouthpiece placing portion,
   the mouthpiece-mounted liner further comprising
   a seal member extended in a layer-like form to cover the opening recess from a surface of the liner on an outer side of the recess inner circumferential wall of the recessed mouthpiece placing portion to a surface of the mouthpiece flange on a center side of the flange outer peripheral edge, wherein
   the seal member is not disposed between the mouthpiece contacting surface of the liner and the mouthpiece flange, and
   in a vertical section of the liner with mouthpiece, the flange outer peripheral edge and the recess inner circumferential wall of the recessed mouthpiece placing portion are formed to satisfy Expression (1):

$$Dt > (Sm/Xgs) \cdot 100 \tag{1}$$

where Dt denotes a width of an opening of the opening recess, said Dt being defined to be a distance between a flange outer peripheral edge-side end and a recess inner circumferential wall-side end of an opening of the opening recess, Sm denotes a maximum tolerance of a relative positional misalignment between the recess inner circumferential wall of the recessed mouthpiece placing portion and an outer circumferential end of the flange outer peripheral edge, and Xgs [%] denotes a breaking elongation of the seal member.

4. The mouthpiece-mounted liner according to claim 3, wherein the seal member is formed by applying and curing a liquid gasket.

* * * * *